H. M. NORRIS.
RADIAL DRILL.
APPLICATION FILED AUG. 30, 1910.
1,022,439.
Patented Apr. 9, 1912.
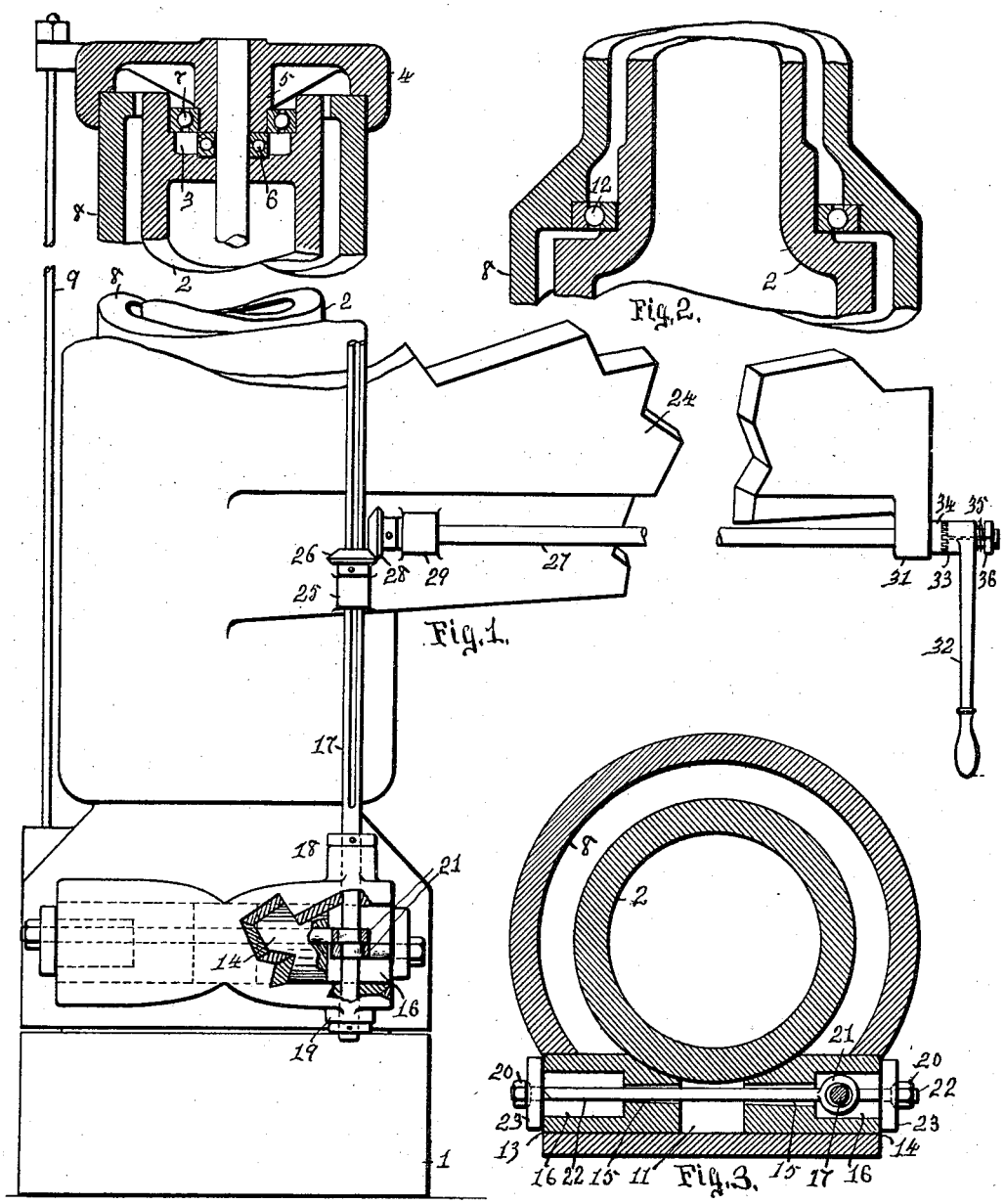
WITNESSES.
W. Thornton Bogert.
Samuel Carr.
Henry M. Norris, INVENTOR
BY Robert S. Carr.
ATTORNEY.

UNITED STATES PATENT OFFICE.

HENRY M. NORRIS, OF CINCINNATI, OHIO, ASSIGNOR TO THE CINCINNATI BICKFORD TOOL COMPANY, OF CINCINNATI, OHIO, A CORPORATION OF OHIO.

RADIAL DRILL.

1,022,439.   Specification of Letters Patent.   Patented Apr. 9, 1912.

Application filed August 30, 1910. Serial No. 579,781.

*To all whom it may concern:*

Be it known that I, HENRY M. NORRIS, a citizen of the United States, residing at Cincinnati, Ohio, have invented a new and useful Improvement in Radial Drills, of which the following is a specification.

My invention relates to radial drills and the objects of my improvements are to provide a ball bearing for supporting the sleeve on the column and also ball bearings for maintaining the sleeve concentric therewith to provide adjustable clamping plugs for maintaining the sleeve in predetermined positions of rotative adjustment on the column; to provide novel means for actuating said plugs; to provide means for actuating the clamping plugs from the extremity of the radial arm and conveniently accessible to the operator, and to provide simple and durable construction and assemblage of the various members for securing facility of operation and efficiency of action. These objects are attained in the following described manner, as illustrated in the accompanying drawings, in which—

Figure 1 is a front elevation with parts broken away and parts in section of a radial drill embodying my improvements; Fig. 2, a vertical diametrical section of portions of the column and sleeve, and Fig. 3, a transverse section on the axial line of the clamping plugs.

In the drawings, 1 represents the base and 2 a cylindrical column thereon formed in its upper end with a counterbore 3. A cap 4 is formed with a cylindrical hub 5 whereby it is supported on a ball bearing 6 within the counterbore. A ball bearing 7 encircles said hub within the counterbore for maintaining the cap concentric therewith. A hollow cylindrical sleeve 8 removably secured to the cap by means of rods 9 encircles the column and terminates near the base. Said sleeve is formed in one side of its lower portion with a transverse opening 11 and is maintained at its lower end concentric with the column by means of a ball bearing 12. Similar clamping plugs 13 and 14 each formed with an axial opening 15 and with an open slot 16 in its rear end are movable within the opening 11. A vertical shaft 17 journaled in fixed bearings 18 and 19 is formed with oppositely disposed eccentrics 21 which are thereby rotatable within the open slot of one of the plugs. Rods 22 engaging with the respective eccentrics are extended through the bore in the corresponding plugs and through the caps or washers 23. Nuts 20 threaded on the ends of rods 22 in contact with caps 23 serve to adjust the plugs independently for contacting with the column.

A radial arm 24 vertically adjustable on the sleeve in the usual manner is formed with a bearing 25 wherein a miter gear 26 splined on shaft 17 is journaled. A horizontal shaft 27 provided on one end with a miter gear 28 in continuous engagement with gear 26 is journaled in bearings 29 and 31 on the radial arm and terminates at the other end beyond the extremity thereof. A hand lever 32 splined on the projecting portion of said shaft is formed with radial serrations 33 on its hub adapted to engage with corresponding serrations formed in the face of boss 34 adjacent thereto formed on the radial arm. A coil spring 35 encircles the shaft 17 in contact with the hand lever and is adjustable by means of the nut 36 threaded on the end of said shaft for moving and maintaining under a yielding pressure the hand lever into engagement with the boss 34.

In operation, in any vertical position of adjustment of the radial arm on the sleeve the hand lever is conveniently accessible to the operator for communicating rotative adjustment through the horizontal shaft and miter gears to the vertical eccentric shaft. A half turn of the eccentric shaft carries the eccentric rods thereon just beyond their centers and thereby moves and maintains the clamping plugs into clamping contact with the column for maintaining the sleeve with the radial arm in predetermined positions of rotative adjustment on the column.

The serrated boss serves to engage with the hand lever and yieldingly maintain it in any released position. The ball bearings serve to maintain the sleeve concentric with the column and facilitate its rotative adjustment thereon with the radial arm.

Having fully described my improvements, what I claim as my invention and desire to secure by Letters Patent of the United States is:—

1. In a radial drill, the combination with a column, a sleeve thereon formed with a transverse opening having its axis parallel to a tangent to the column, and a radial arm on the sleeve, of oppositely disposed clamping plugs movable in said opening in the sleeve, a shaft having two cams thereon, adjustable connections between said cams and the respective plugs, a lever on the arm, and connections therewith for actuating the shaft with the plugs into clamping engagement with the column.

2. In a radial drill, the combination of a column, a sleeve rotatively adjustable thereon, a pair of oppositely disposed clamping plugs carried by the sleeve and movable in a tangent to the column, a shaft journaled on the sleeve and provided with oppositely disposed cams, adjustable connections between said cams and said plugs, a radial arm on the sleeve, a shaft journaled thereon and provided with a hand lever, and gear connections between said shaft and the cam shaft, whereby the plugs may be actuated simultaneously into clamping engagement with the column for maintaining the sleeve in predetermined position of rotative adjustment.

3. A radial drill comprising a column, a sleeve rotatively supported concentric therewith and formed with a transverse opening, similar clamping plugs in said opening, a shaft provided with oppositely disposed eccentrics, rods adjustably connecting the plugs with the respective eccentrics, and means for turning the shaft with the plugs into clamping engagement with the column.

4. A radial drill comprising a column, a sleeve thereon, clamping plugs in the sleeve, a shaft provided with oppositely disposed eccentrics, adjustable connections from the eccentrics with the respective plugs, and means for turning the shaft for moving and maintaining the plugs into simultaneous clamping engagement with the column.

5. A radial drill comprising a column, a cap, a ball bearing arranged to support the cap on the column, a ball bearing arranged to maintain the cap concentric with the column, a sleeve secured to the cap and depending therefrom concentric with the column, a ball bearing between the lower portion of the sleeve and the column, and a radial arm on the sleeve.

H. M. NORRIS.

Witnesses:
MATT. J. DAY,
R. S. CARR.

Copies of this patent may be obtained for five cents each, by addressing the "Commissioner of Patents, Washington, D. C."